US006955483B2

(12) United States Patent
Narayan

(10) Patent No.: US 6,955,483 B2
(45) Date of Patent: Oct. 18, 2005

(54) PACKAGES FOR HOUSING OPTOELECTRONIC ASSEMBLIES AND METHODS OF MANUFACTURE THEREOF

(75) Inventor: Raghu Narayan, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/748,054

(22) Filed: Dec. 30, 2003

(65) Prior Publication Data

US 2005/0141829 A1  Jun. 30, 2005

(51) Int. Cl.[7] ............................................... G02B 6/36
(52) U.S. Cl. .......................................... 385/94; 385/93
(58) Field of Search ..................... 385/88–94; 257/79, 257/80; 372/38.1

(56) References Cited

U.S. PATENT DOCUMENTS

| | | | |
|---|---|---|---|
| 6,092,935 A | * | 7/2000 | Althaus et al. ............... 385/93 |
| 6,108,130 A | | 8/2000 | Raj |
| 6,281,997 B1 | | 8/2001 | Alexander et al. |
| 6,283,644 B1 | | 9/2001 | Gilliland et al. |
| 6,345,138 B1 | | 2/2002 | Kawai et al. |
| 6,376,268 B1 | | 4/2002 | Verdiell |
| 6,404,948 B2 | | 6/2002 | Alexander et al. |
| 6,542,672 B2 | | 4/2003 | Jewell et al. |

* cited by examiner

Primary Examiner—Frank G. Font
Assistant Examiner—Michael P. Mooney
(74) Attorney, Agent, or Firm—Marshall, Gerstein & Borun LLP

(57) ABSTRACT

A package for housing an optoelectronic device such as a photodiode or laser diode is disclosed. The package includes a base having an upper surface. The photodiode chip and related circuitry are mounted to the upper surface of the base. A fiber receptacle structure is mounted to the base and hermetically encloses the photodiode/laser diode chip without the need for a separate cap and lens structure. In the event insulating base is utilized, the plurality of via holes are preferably drilled through the base and the via holes are filled with conductive material thereby enabling the fiber receptacle structure to be hermetically welded to the insulating base using the disclosed process.

19 Claims, 3 Drawing Sheets

PACKAGES FOR HOUSING OPTOELECTRONIC ASSEMBLIES AND METHODS OF MANUFACTURE THEREOF

TECHNICAL FIELD

Packages adapted to house optoelectronic assemblies are disclosed. More specifically, packages for coupling light from a photodiode to an optical fiber are disclosed.

BACKGROUND

Optoelectronic components or active optical devices such as diode lasers, light-emitting diodes (LEDs), and photodiode detectors are used for printing, data storage, optical data transmission and reception, laser pumps, and a multitude of other applications. Most optoelectronic components are typically sealed inside a hermetically sealed package for performance requirements and operational stability. Optoelectronic packages are intended to provide a hermetic structure to protect passive and active optical elements and devices as well as related electrical components from damage resulting from moisture, dirt, heat, radiation, and/or other sources.

For high-speed applications (e.g., 1 Gbps and above), proper operation of the optical and/or electrical components inside the package may be affected unless careful attention is paid to the packaging of these components. Standard optical module packaging such as that used in optical telecommunication applications requires a hermetic enclosure. Sealed packages are necessary to contain, protect, and electrically connect optoelectronic components. These requirements have resulted in packages that are large, costly, and more difficult to manufacture than typical electronic packages. In fact, the size cost of most optoelectronic devices are mainly drive by the package rather than the optical devices themselves.

Current designs of optoelectronic packages and associated fabrication processes are not easily adapted for automated manufacturing techniques because conventional packages for optoelectronic components such as large so-called "butterfly" packages are characterized by numerous mechanical parts (submounts, brackets, ferrules, etc.), three-dimensional (3D) alignment requirements, and poor mechanical stability. Butterfly packages are basically can-and-cover type arrangements that contain an optical assembly mounted to a metallic baseplate, with leads coming out of the sides for electrical connections. The optical assembly may be built up separately, outside of the can, and then later installed inside the can. The circuits within the optical assembly are wire-bonded to the leads of the butterfly can, which is then sealed with a lid to create a hermetic enclosure. Conventional butterfly cans are bulky, costly, and time-consuming to manufacture. Further, the electrical components require a separate subassembly that is located outside of the butterfly can.

Transistor-Outline (TO) packages are also commonly used to house optoelectronic components. Conventional TO packages include a generally cylindrical metal cap and a metal header or base, to which the metal cap is attached. In such packages, metal-based bonding techniques such as, for example, brazing or fusion welding, are often required to provide a hermetic seal between the metal cap and the header. To weld the metal cap onto the header, the header is typically formed of a metallic material such as Kovar™ or stainless steel. However, it is advantageous to use ceramic bases in connection with high-speed applications because ceramic bases are ideal for RF applications. Specifically, ceramic headers provide easy routing of high-speed circuits. Because ceramic is not compatible with metal with regard to weldability, it has not been widely used as the material of construction for the header or base in conventional TO packages. A new family of TO headers which have a ceramic base with a weld ring may also be used for high speed applications.

Conventional TO packages for receiver optical sub-assemblies (ROSA) and transceiver optical sub-assemblies (TOSA) are typically large and result in the photodiode chip being spaced apart from the end of the fiber stub by a distance ranging from about 2 to about 3 mm. This large spacing is required because a cap structure is conventionally used to enclose and hermetically seal around the photodiode chip which is disposed on a metallic or ceramic base. The cap structure enclosing the photodiode chip includes a lens disposed in its top wall that must be aligned precisely with the fiber stub. The fiber stub is accommodated within the fiber receptacle which is either welded or epoxied onto the lens cap.

The manufacture of the ROSA is essentially a two part process that requires precise alignment of the cap and the fiber receptacle. Thus, an error in any one of these attachment steps will result in a defective product. As a result, the process is inefficient, time consuming and costly. Further, the fiber stub is disposed a relatively large distance from the photodiode chip, typically between 2 and 3 millimeters, which results in a package that is quite large thereby limiting its applications.

Therefore, there is a need for improved optoelectronic packages and processes for manufacturing optoelectronic packages that can address some or all of the problems described above.

BRIEF DESCRIPTION OF THE DRAWINGS

The disclosed optoelectronic packages and methods of manufacture thereof are disclosed more or less diagrammatically in the accompanying drawings wherein.

DETAILED DESCRIPTION OF THE PRESENTLY PREFERRED EMBODIMENTS

Figure 1:
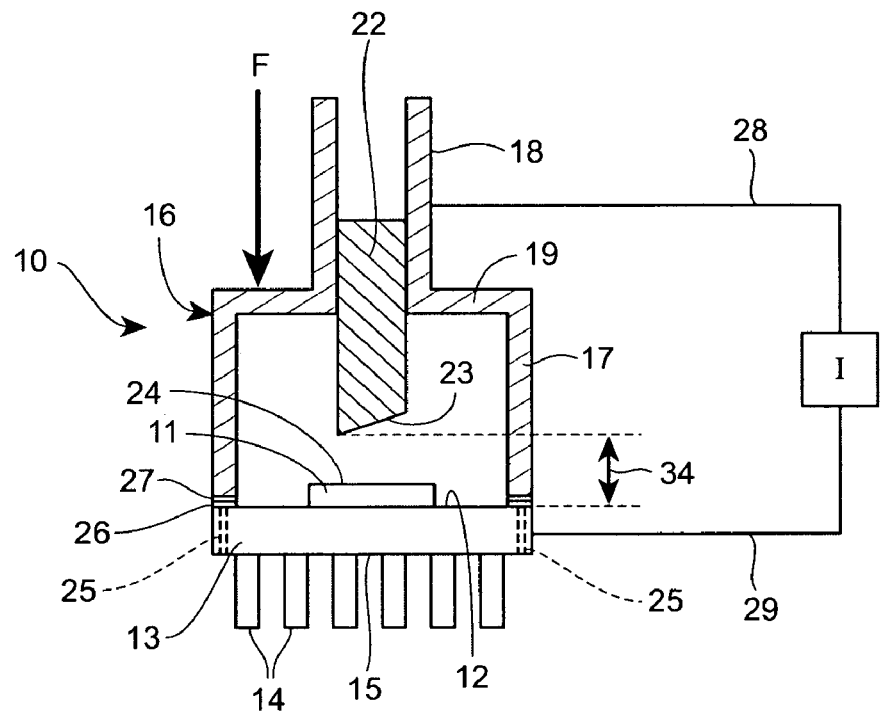
FIG. 1 is a schematic illustration of a receiver optical sub-assembly (ROSA) module attached to a base with a transition outline (TO) type can structure and further illustrating a method for attaching the TO-type can structure to a metallized insulating base.

FIG. 1 illustrates a ROSA module 10 packaged in accordance with this disclosure. It will also be noted that the packages and manufacturing methods disclosed herein are also applicable to other devices, including, but not limited to transreceiver optical sub-assembly (TOSA) modules.

As shown in FIG. 1, a photodiode chip 11 is mounted to the upper surface 12 of a base 13. A plurality of leads shown at 14 extend downward from a lower surface 15 of the base 13. Photodiode chip is not separately enclosed with any type of conventional cap structure or a cap equipped with a lens. Instead, the enclosure is made by the fiber receptacle structure 16. The fiber receptacle structure 16 includes a lower cylindrical portion 17 which is connected to an upper cylindrical portion 18 by an annular wall 19. The can structure 16 is mounted to the base 13 in such a way that the upper cylindrical portion 18 is aligned axially with the photodiode chip. Typically, the can structure 16 is pre-attached to an angled fiber stub 22 as shown in FIG. 1. Preferably, the fiber stub 22 has an angled proximal surface 23 that presents a surface disposed at an acute angle with respect to a plane presented by an upper surface of the photodiode chip 23 so as to reduce reflectance of light transmitted back to the fiber towards the transmitter.

The base 13 may be metallic or may be fabricated from an insulating material. Suitable insulating materials for the base 13 include ceramics such as alumina, beryllium oxide (BeO), and aluminum nitride (AlN). If the base 13 is fabricated from a metal, then the fiber receptacle structure 16 may be easily attached to the base 13 using the standard laser welding technique or resistance welding technique. However, if the can structure 16 is fabricated from metal and the base 13 is fabricated from an insulating material, such as a ceramic, then a slightly more complicated attachment process is required.

Figure 4:
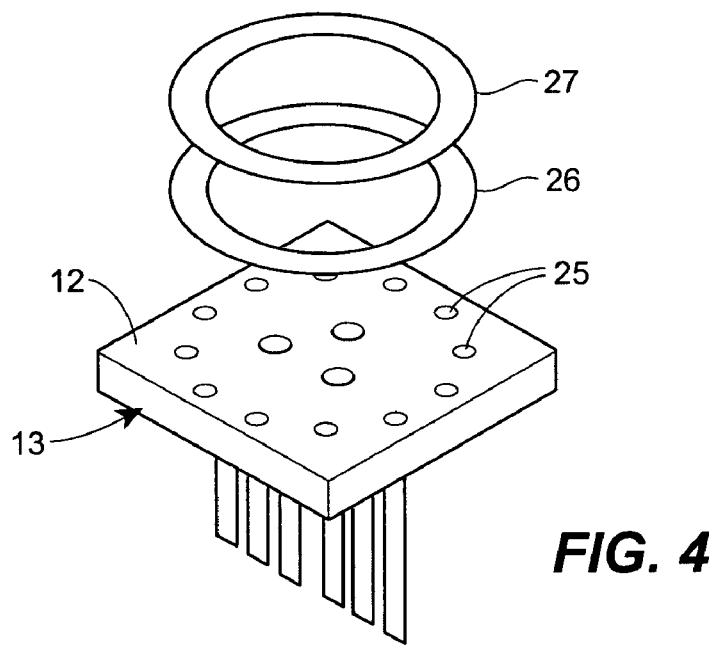
FIG. 4 further illustrates the method of attaching a TO can structure to an insulating base as disclosed in FIG. 1.

One option is to equip the base 13 with a plurality of vias shown in phantom at 25 in FIG. 1. The vias 25 would then be filled with a conductive material, such as metal. The base 13 would also be metallized on its upper surface 12 and lower surface 15. The lower cylindrical portion 17 of the can structure 16 would then be aligned with the vias 25 and welded to the metal material disposed therein. This is further illustrated in FIG. 4 which shows the base 13 equipped with a plurality of vias 25 arranged in a circle. However, as further in shown in FIG. 4 and in FIG. 1, additional annular layers can be provided to effect a hermetic seal between the lower cylindrical portion 17 of the can structure 16 and the base 13. Specifically, an adhesive layer 26 in addition to a metal sealing layer 27 can be employed or a metal sealing layer 27 alone can be employed.

To effectuate a seal, the fiber receptacle 16 is pressed downward and an electrical current is supplied through the leads 28, 29 to the fiber receptacle 16 and base 13 to resistance weld the fiber receptacle 16 to the base 13. If the entire outer surface of the base 13 is metallized, then the lead 29 may be attached anywhere on the base, so long as it does not interfere with the connection between the can 16 and the base 13. However, if only the upper and lower surfaces of the base 13 are metallized, then the lead 29 would need to engage the lower surface 15 of the base 13. Again, the hermetic sealing capability of the process shown in FIGS. 1 and 4 may be further improved by use of a metal sealing ring 27 which may be mounted directly to the base 10, 13 or the combination of a metal sealing ring 27 connected to the base 13 by way of an annular adhesive layer 26.

The metallized layers on one or more of the upper surface 12 and lower surface 15 of the base 13 (not shown) may be deposited using physical vapor deposition (PVD) techniques such as evaporation, sputtering, screen printing or other suitable processes. The conductive material used for the metallized layers may include metal such as copper, gold, tin, copper/tin alloys, tungsten, lead, nickel, palladium, KOVAR™ or other similar metals. Because the metallized layers are used for being soldered or braised, thick film deposition techniques are preferred.

Preferably, the metallized layers would have thicknesses of about 1 to 10 $\mu$m. However, if desired, thin film metallization techniques may be employed.

The same material used for the metallized layers may be used to fill the via holes 25 in the base 13. Also, the via holes may be filled with flowable solder or maybe screen-filled using a paste of conductive materials such as copper or tungsten.

The via holes 25 are preferably formed through the base 13 using a mechanical drilling process or a laser machining process. The diameter of each hole 25 is preferably half the thickness of the base 13. The spacing between the via holes 25 is approximately twice the diameter of the via holes. Of course different spacings and diameters may be employed.

The resistance between the fiber receptacle structure 16 and the metal sealing member 27 are designed to produce sufficient heat to create a fusion between the metallized upper layer 12 of the base 13, the metal sealing member 27 and the lower cylindrical portion 17 of the can structure 16 that results from a liquid molten pool of material from the metals that forms an interface between the lower cylindrical portion 17 of the can 16 and the upper surface 12 of the base 13. The welding parameters, i.e., the force imposed on the can structure 16, the current, time, etc., will depend upon the thickness of the metallic components being welded together, the resistance of the current path and the size of the desired weld nugget or weld interface.

Figure 2:
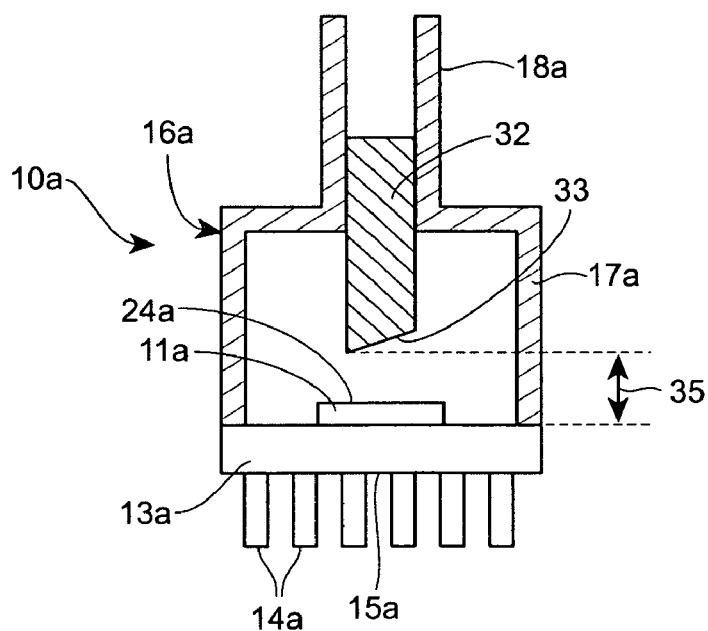
FIG. 2 illustrates, schematically, an alternative embodiment of the TO can structure of FIG. 1 but equipped with a GRIN lens as opposed to an angled fiber stub as shown in FIG. 1.

Turning to FIG. 2, a similar embodiment is disclosed with the exception that the angled fiber stub 22 has been replaced with a gradient index lens (GRIN) 32 also having an angled proximal surface 33 to limit reflection between the surface 33 of the GRIN lens 32 and the photodiode chip 11a. FIG. 2 also illustrates, generally, the use of a metal base 13a which eliminates the need for the adhesive layer 26 and metal sealing layer 27 shown in FIG. 1. However, an insulating base can be used with the embodiment shown in FIG. 2 as well.

It will also be noted that in the embodiments 10, 10a shown in FIGS. 1 and 2 respectively, the distance between the proximal surfaces 23, 33 and the photodiode chips 11, 11a are relatively short. In the embodiment shown in FIG. 1, the distance labeled 34 between the surface 23 of the angled fiber stub and the photodiode chip 11 will typically range from about 50 to about 100 $\mu$m. In FIG. 2, the distance labeled 35 between the surface 33 of the lens 32 and the photodiode chip 11a will typically range from about 100$\mu$ to about 1,000 $\mu$m. In the embodiment shown in FIG. 1, the fiber ferrule provided by the upper cylindrical portion 18 may be easily designed such that during a resistance welding, the fiber stub 22 experiences no significant increase in temperature. In the embodiment 10a shown in FIG. 2, the GRIN lens 32 permits the photodiode 11a and GRIN lens surface 33 separation to be somewhat higher, between 100 and 1,000 $\mu$m because of the focusing capability of a GRIN lens. Typically, the GRIN lens 32 provides coupling of light from a very small active area photodiode 11a while keeping the focusing distance minimal.

In both FIGS. 1 and 2, the seal between the fiber receptacle 16 and the base 13 is a hermetic seal. This implies that the seal between the fiber stub (22 if FIG. 1, 32 in FIG. 2) and the metallic housing (18 in FIG. 1, 18a in FIG. 2) is a hermetic seal.

Figure 3A:
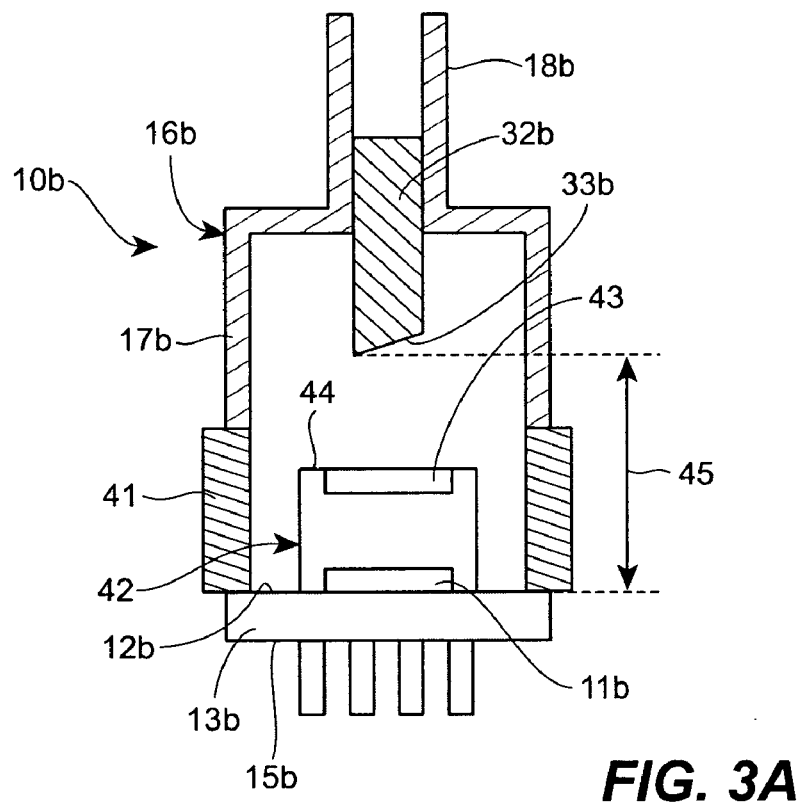
FIGS. 3A–3C illustrate, schematically, other alternative embodiments of the disclosed TO can structure with a spacer disposed between the can structure and the base and with a cap disclosing a photodiode chip with a flat window disposed in an upper wall thereof.
Figure 3B:
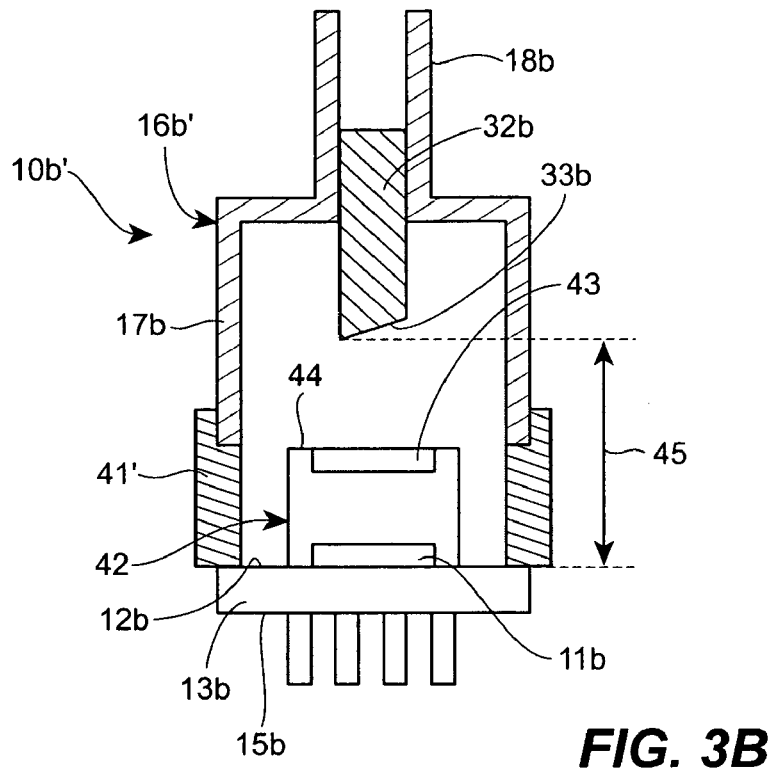
Figure 3C:
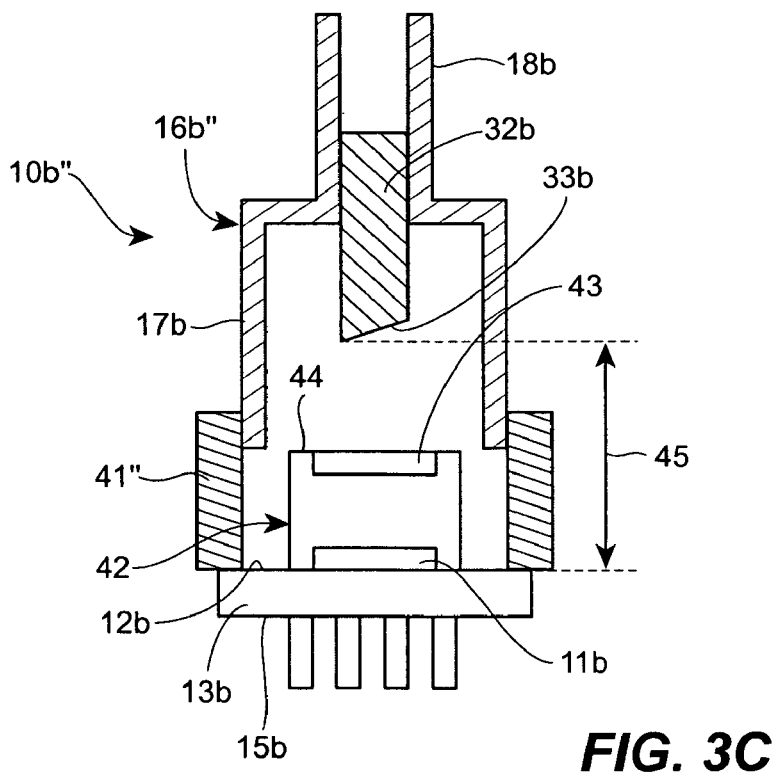

In the embodiments 10b, 10b' and 10b" shown in FIGS. 3A–3C, a spacer 41 is disposed between the fiber receptacle 16b and the base 13b. In addition, a cap 42 is disposed over the photodiode 11b having a flat window 43 disposed in an upper wall 44 thereof. In the embodiment 10b, the photodiode 11b may be hermetically sealed by the cap 42 thereby eliminating the need for the fiber receptacle structure 16b to be hermetically sealed to the base 13b. Further, because a GRIN lens 32b is utilized, the distance between the proximal surface 33b and the photodiode chip may be extended to the conventional range of 2 to 3 mm as represented by the distance line 45. The fiber receptacle 16 may also be spot welded or epoxied directly to the spacer 41 or the cap 42. FIGS. 3B and 3C illustrate other connections between the fiber receptacles 16b', 16b" and the spacers 41' and 41".

In the foregoing description, the disclosed structures and manufacturing methods have been described with reference to exemplary embodiments. It will, however, be evident that various modifications and changes may be made thereto without departing from the broader spirit and scope of this disclosure. The above specification and figures accordingly are to be regarded as illustrative rather than restrictive. It is therefore intended that the present disclosure be unrestricted by the foregoing description and drawings, except as may appear in the following appended claims.

What is claimed is:

1. A package adapted to house an optoelectronic device, the package comprising:
   a base having an upper surface, wherein the optoelectronic device is mounted to the upper surface;
   a metallic can structure comprising a lower cylindrical portion coaxially connected to an upper cylindrical portion by an annular wall, the lower cylindrical portion being connected to the base; and
   the upper cylindrical portion accommodating one of an optical fiber stub or a GRIN lens;
   and wherein the base is made from a ceramic material and further comprises a plurality of holes extending through the upper and lower surfaces of the base, each of the plurality of holes is filled with a conductive material for conducting welding current to connect the lower cylindrical portion of the can structure to the base.

2. The package of claim 1 further comprising a metal seal ring disposed between the upper surface of the base and the lower cylindrical structure of the can structure.

3. A package adapted to house an optoelectronic device, the package comprising:
   a base having an upper surface, wherein the optoelectronic device is mounted to the upper surface;
   a can structure comprising a lower cylindrical portion coaxially connected to an upper cylindrical portion by an annular wall, the lower cylindrical portion being connected to the base; and
   the upper cylindrical portion accomodating an optical fiber stub that is axially aligned with the optoelectronic device and the fiber stub terminates at an end surface that faces the optoelectronic device but which defines a plane disposed at an acute angle with respect to a radius that is perpendicular to an axis of the fiber stub; and
   wherein the minimum distance between the end surface of the fiber and the upper surface of the base ranges from about 50 to about 100 $\mu$m.

4. A package adapted to house an optoelectronic device, the package comprising:
   a base having an upper surface, wherein the optoelectronic device is mounted to the upper surface;
   a can structure comprising a lower cylindrical portion coaxially connected to an upper cylindrical portion by an annular wall, the lower cylindrical portion being connected to the base;
   wherein the upper cylindrical portion of the can structure accomodates a GRIN lens that faces the optoelectronic device but which defines a plane disposed at an acute angle with respect to a radius that is perpendicular to an axis of the GRIN lens.

5. The package of claim 4 wherein a minimum distance between the GRIN lens and the upper surface of the base ranges from about 100 to about 1000 $\mu$m.

6. The package of claim 4 further comprising a spacer ring disposed between the lower cylindrical portion of the can structure and the upper surface of the base.

7. The package of claim 6 wherein the optoelectronic device is sealed to the base by a metallic cover having a top wall with a window disposed therein.

8. The package of claim 7 wherein a minimum distance between the GRIN lens and the upper surface of the base ranges from about 1 to about 3 mm.

9. The package of claim 1 wherein the optoelectronic device is a photodiode.

10. The package of claim 1 wherein the optoelectronic device is a semiconductor chip.

11. The package of claim 1 wherein the optoelectronic device is a lased diode such as a VCSEL.

12. A method for hermetically packaging a photodiode chip to an insulating base, the method comprising:
    metallizing an upper surface of the insulating base;
    mounting the photodiode chip on the upper surface of the insulating base;
    attaching a can structure to the insulating base, the can structure comprising a lower cylindrical portion coaxially connected to an upper cylindrical portion by an annular wall, the upper cylindrical portion accomodating one of an optical fiber stub or a grin lens; the lower cylindrical portion being hermetically sealed to the base and the upper cylindrical portion being axially aligned with the photodiode chip, and wherein the attaching of the lower cylindrical portion of the can structure to the metallized upper surface of the insulating base is performed by resistance welding.

13. A method for hermetically packaging a photodiode chip to a base, the method comprising:
    mounting the photodiode chip to an upper surface of the base;
    attaching a can structure to the base, the can structure comprising a lower cylindrical portion coaxially connected to an upper cylindrical portion by an annular wall, the upper cylindrical portion accommodating one of an optical fiber stub or a grin lens; the lower cylindrical portion being hermetically sealed to the base and the upper cylindrical portion being axially aligned with the photodiode chip; and
    attaching a metal sealing ring between the lower cylindrical portion of the can structure and the base using an adhesive layer located between the metal sealing ring and the upper metallized surface of the base.

14. The method of claim 13 wherein the base is an insulating base and the method further comprising:
    forming a plurality of holes that extends through the upper and lower surfaces of the insulating base and metallizing upper and lower surfaces of the insulating base;
    filling the plurality of holes with a conductive material; and
    attaching to the lower cylindrical portion of the can structure to the upper surface of the insulating base, wherein the lower cylindrical portion of the can structure is in contact with each of the plurality of filled holes and the attaching of the lower cylindrical portion of the can structure to the upper metallized surface of the insulating base is performed by resistance welding.

15. The method of claim 14 wherein the method further comprises:
attaching a metal sealing ring between the lower cylindrical portion of the can structure and the insulating base using an adhesive layer located between the metal sealing ring and the upper metallized surface of the insulating base.

16. An automated process for manufacturing a package, wherein the package is adapted to house an optoelectronic assembly, the automated process comprising:
providing an insulating base having an upper surface and a lower surface, wherein the insulating base includes a plurality of vias formed through the upper and lower surfaces of the insulating base, and wherein the plurality of vias is filled with a conductive material;
forming a metallization layer on each of the upper and lower surfaces of the insulating base;
attaching a metal sealing ring to the upper metallized surface of the insulating base;
mounting the photodiode chip to the upper metallized surface of the insulating base and within an inner region of the metal sealing ring;
aligning a metal can structure over the photodiode chip, the can structure comprising a lower cylindrical portion coaxially connected to an upper cylindrical portion by an annular wall, the upper cylindrical portion accommodating one of an optical fiber stub or a grin lens; the aligning resulting in the upper cylindrical portion being axially aligned with the photodiode chip and the lower cylindrical portion being aligned with the metal sealing ring and vias; and
sealing the lower cylindrical portion to the insulating base to hermetically enclose the photodiode chip.

17. The automated process of claim 16 wherein sealing the lower cylindrical portion to the insulating base includes hermetically sealing a lower edge of the lower cylindrical portion to the metal sealing ring that is attached to the insulating base using one of a laser welding technique and a resistance welding technique.

18. A laser comprising:
a base formed of an electrically insulating material, wherein an laser diode chip and an electronic circuit electrically connected to the optical device are mounted to the base;
a sealing member formed of an electrically conducting material and attached to the base, wherein the sealing member extends along a perimeter of the base with the photodiode chip and the electronic circuit being located within an inner region of the sealing member; and
a can structure formed of the electrically conducting material, wherein the can structure is adapted to attach to the sealing member on the base to provide a hermetic enclosure for the laser diode chip and the electronic circuit, the can structure comprising the can structure comprising a lower cylindrical portion coaxially connected to an upper cylindrical portion by an annular wall, the upper cylindrical portion accommodating one of an optical fiber stub or a grin lens; the lower cylindrical portion being hermetically sealed to the base and the upper cylindrical portion being axially aligned with the photodiode chip.

19. The laser of claim 18 further including a plurality of holes formed through the insulating base, wherein each of the plurality of holes is filled with a conductive material, and wherein each of the plurality of holes is adapted to conduct welding current to connect the lower cylindrical portion of the can structure to the base.

* * * * *

UNITED STATES PATENT AND TRADEMARK OFFICE
CERTIFICATE OF CORRECTION

PATENT NO. : 6,955,483 B2  
APPLICATION NO. : 10/748054  
DATED : October 18, 2005  
INVENTOR(S) : Raghuram Narayan It is certified that error appears in the above-identified patent and that said Letters Patent is hereby corrected as shown below:

Column 5, line 49, "accomodating" should be --accommodating--,

Column 5, line 67, "accomodates" should be --accommodates--,

Column 6, line 30, "accomodating" should be --acommodating--,

Column 6, line 31, "grin lens" should be --GRIN lens--,

Column 6, line 46, "grin lens" should be --GRIN lens--,

Column 7, line 27, "grin lens" should be --GRIN lens--,

Column 8, line 7, "an laser" should be --a laser--,

Column 8, line 24, "grin lens" should be --GRIN lens--,

Signed and Sealed this

Twenty-first Day of November, 2006

JON W. DUDAS  
*Director of the United States Patent and Trademark Office*